(12) United States Patent
Ko et al.

(10) Patent No.: US 8,427,958 B2
(45) Date of Patent: Apr. 23, 2013

(54) DYNAMIC LATENCY-BASED REROUTING

(75) Inventors: Kung-Ling Ko, Union City, CA (US); Surya Prakash Varanasi, Dublin, CA (US); Satsheel B. Altekar, San Jose, CA (US); John Michael Terry, San Jose, CA (US); Venkata Pramod Balakavi, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 377 days.

(21) Appl. No.: 12/771,943

(22) Filed: Apr. 30, 2010

(65) Prior Publication Data

US 2011/0267952 A1 Nov. 3, 2011

(51) Int. Cl.
*G06F 11/00* (2006.01)

(52) U.S. Cl.
USPC .............................. 370/237; 370/389; 370/474

(58) Field of Classification Search .................. 370/237, 370/230, 389, 474
See application file for complete search history.

(56) References Cited

U.S. PATENT DOCUMENTS

| | | | |
|---|---|---|---|
| 5,022,025 A | 6/1991 | Urushidani et al. |
| 5,090,011 A | 2/1992 | Fukuta et al. |
| 5,197,064 A | 3/1993 | Chao |
| 5,274,631 A | 12/1993 | Bhardwaj |
| 5,305,311 A | 4/1994 | Lyles |
| 5,390,173 A | 2/1995 | Spinney |
| 5,450,394 A | 9/1995 | Gruber et al. |
| 6,084,858 A | 7/2000 | Matthews et al. |
| 6,111,877 A | 8/2000 | Wilford et al. |
| 6,363,056 B1 | 3/2002 | Beigi et al. |
| 6,434,118 B1 | 8/2002 | Kirschenbaum |
| 6,578,066 B1 | 6/2003 | Logan et al. |
| 6,665,297 B1 | 12/2003 | Hariguchi et al. |
| 6,665,702 B1 | 12/2003 | Zisapel et al. |
| 6,717,917 B1 | 4/2004 | Weissberger et al. |
| 6,868,094 B1 | 3/2005 | Bordonaro et al. |
| 7,020,714 B2 | 3/2006 | Kalyanaraman et al. |
| 7,113,485 B2 | 9/2006 | Bruckman |
| 7,206,288 B2 | 4/2007 | Cometto et al. |
| 7,391,731 B1 | 6/2008 | Skelly et al. |
| 7,454,500 B1 | 11/2008 | Hsu et al. |

(Continued)

OTHER PUBLICATIONS

Schroeder, Michael D., "Autonet: a High-speed Self-Configuring Local Area Network Using Point-to-point Links," Apr. 21, 1990, SRC Research Report 59, Digital Equipment Corporation 1990.

(Continued)

*Primary Examiner* — Phuc Tran
(74) *Attorney, Agent, or Firm* — Shun Yao; Park, Vaughan, Fleming & Dowler LLP

(57) ABSTRACT

A switch creates and dynamically updates a latency map of a network to adjust routing of flows. Further, the network is monitored to detect latency issues and trigger a dynamic adjustment of routing based on the latency map. In this manner, a flow can be routed along a route (i.e., a faster route) that provides less latency than other available routes. The latency map can be generated based on latency probe packets that are issued from and returned to the source switch. By evaluating many such latent probe packets that have traveled along many available routes (e.g., corresponding to various ports of the switch), the switch or associated administrative logic can dynamically adjust the latency map to updated latency information of available routes. Therefore, responsive to a trigger, the source switch can dynamically adjust the routing of a flow based on latency issues discerned from the network.

25 Claims, 13 Drawing Sheets

U.S. PATENT DOCUMENTS

| | | |
|---|---|---|
| 7,619,982 B2 | 11/2009 | Blair et al. |
| 8,116,200 B2 * | 2/2012 | Tychon et al. ............... 370/231 |
| 2002/0059464 A1 | 5/2002 | Hata et al. |
| 2002/0124096 A1 | 9/2002 | Loguinov et al. |
| 2002/0150048 A1 | 10/2002 | Ha et al. |
| 2002/0154600 A1 | 10/2002 | Ido et al. |
| 2002/0156918 A1 | 10/2002 | Valdevit et al. |
| 2003/0018796 A1 | 1/2003 | Chou et al. |
| 2003/0031185 A1 | 2/2003 | Kikuchi et al. |
| 2004/0064577 A1 | 4/2004 | Dahlin et al. |
| 2005/0094568 A1 | 5/2005 | Judd |
| 2005/0094630 A1 | 5/2005 | Valdevit |
| 2005/0169180 A1 | 8/2005 | Ludwig |
| 2005/0286416 A1 | 12/2005 | Shimonishi et al. |
| 2009/0193147 A1 | 7/2009 | Lepeska |
| 2009/0313415 A1 | 12/2009 | Sabaa et al. |
| 2009/0316582 A1 * | 12/2009 | Froelich et al. ............... 370/238 |
| 2011/0044173 A1 * | 2/2011 | Kakadia et al. ............... 370/238 |

OTHER PUBLICATIONS

Venkataramani, et al., "TCP Nice: a mechanism for background transfers," Report Information from Dialog DataStar, 2002.

* cited by examiner

DYNAMIC LATENCY-BASED REROUTING

BACKGROUND

With some networks, communication between one node and another node (e.g., a server and a storage device) may be possible via multiple available routes through the network. Such communication is embodied in a sequence of transmitted data frames or a "flow" between the source node and the destination node, wherein the flow typically represents a single session or data exchange within a specific protocol. The flow enters the network at a source switch connected to the source node and leaves the network at a destination switch connected to the destination node.

When the source switch receives a frame of a flow, the source switch checks its routing table to determine whether a route though the network has already been assigned to the flow. If a route has already been assigned, the source switch transmits the frame via the egress port corresponding to the assigned route. If a route has not already been assigned, the source switch selects a route over which to transmit the flow along one of the multiple paths through the network and records the selected route in the routing table.

Typically, such a selection is performed randomly and/or without significant knowledge of downstream network characteristics, and therefore the selected route may not offer the best performance. In other words, in some circumstances, another available route may have provided better performance but it was not selected. In such cases, after that initial selection, the flow is fixed to the lower performance route for the flow's duration (e.g., until the server/storage exchange completes and the flow terminates). For example, a flow may be routed through a part of the network that includes slow switches and/or congested links, while other routes were available that do not include such slow switches or congested links. Yet, by virtue of the initial route selection, the flow remains bound to the slower route until its completion. Such route selection can result in non-optimal routing, particularly for latency-sensitive flows.

Further, network performance can change as the traffic through various network links changes. Therefore, even if an optimal route is initially selected for a given flow, the route may later change to have excessive latency while other routes could provide a lower latency. However, no solutions exist to dynamically adjust routing based on latency distributions and changes in a network.

SUMMARY

Implementations described and claimed herein address the foregoing problems by creating and dynamically updating a latency map of the network to adjust routing of flows. Further, the network is monitored to detect latency issues and trigger a dynamic adjustment of routing based on the latency map. In this manner, a flow can be routed along a route (i.e., a faster route) that provides less latency than other available routes. In a switch handling many flows, rerouting can be accomplished by adjusting congestion mapping among multiple routes, such that routing one or more flows to a lower latency route is favored over routing to a higher latency route. In this manner, some of the flows are rerouted to the lower latency route, which in turn lowers the latency of the higher latency route. The latency map can be generated based on latency probe packets that are issued from and returned to a switch in the network (e.g., a source switch). The latency probe packets are periodically sent to various flow destinations and returned to the switch at the flow source. By evaluating many such latent probe packets that have traveled along many available routes (e.g., corresponding to various ports of the switch), the switch or associated administrative logic can dynamically adjust the latency map to updated latency information of available routes. Therefore, responsive to a trigger, the switch can evaluate the updated latency map and select a faster route among all of the route candidates by which to reroute one or more flows.

Other implementations are also described and recited herein.

BRIEF DESCRIPTIONS OF THE DRAWINGS

DETAILED DESCRIPTIONS

Figure 1:
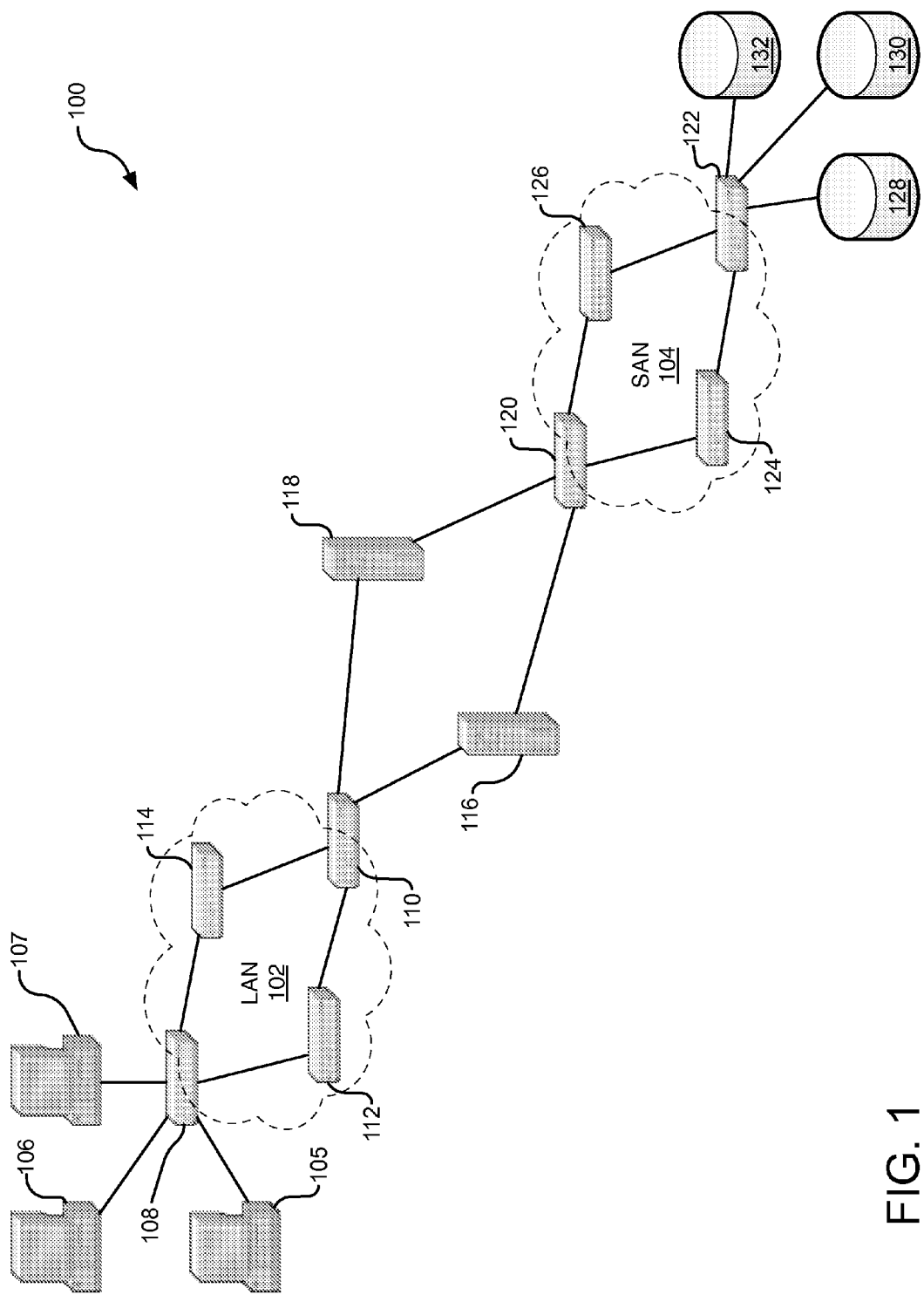
FIG. 1 illustrates an example topology of a local area network (LAN) and a storage area network (SAN) employing dynamic latency-based routing.

FIG. 1 illustrates an example topology 100 of a local area network (LAN) 102 and a storage area network (SAN) 104 employing dynamic latency-based routing. As described, dynamic latency-based routing can be employed in either or both of the LAN 102 and the SAN 104, as well as in other networks, such as a metropolitan area network (MAN), and in networks employing a variety of networking protocols, such as Ethernet, Fibre Channel, Infiniband, etc.

With respect to the LAN 102, FIG. 1 depicts three client nodes 105, 106, and 107 connected to a source switch 108. The LAN 102 can be Ethernet-based or employ another networking protocol, including both wired and wireless protocols. The source switch 108 is connected within the LAN 102 with edge switch 110 via switches 112 and 114. The edge switch 110 then connects to destination nodes, servers 116 and 118. If the client node 106 communicates with the server 116 to access an email server function, a flow would be defined between the client node 106 and the server 116 (e.g., based on a source address of the client node 106 and the destination address of the server). The source address represents a type of source identifier (abbreviated herein as "SID"), and the destination address represents a type of destination identifier (abbreviated herein as "DID").

In the illustrated topology, the source switch 108 has two available routes to communicate the flow through the LAN 102 from the client node 106 and the destination server 116: (1) via the switch 112 and (2) via the switch 114. Once selected, the flow's route is traditionally fixed for the duration of the flow. However, using dynamic latency-based routing, the source switch 108 can detect a latency condition within the LAN 102 and trigger a rerouting to redirect the flow (or one or more other flows) to another available route. For example, the source switch 108 can initially communicate the flow via the switch 112, detect a latency condition along that route, and therefore reroute the flow through the switch 114 based on a latency map of the LAN 102.

With respect to the SAN 104, FIG. 1 depicts the two servers 116 and 118 connected to a source switch 120. The SAN 104 can be Fibre Channel-based or employ another networking protocol, including both wired and wireless protocols. The source switch 120 is connected within the SAN 104 with edge switch 122 via switches 124 and 126. The edge switch 110 then connects to destination storage nodes 128, 130, and 132. If the server 116 communicates with the destination storage node 130 to access email data, a flow would be defined between the server 116 and the destination storage node 130 (e.g., based on a source identifier (SID) of the server 116 and the destination identifier (DID) of the destination storage node 130).

In the illustrated topology, the source switch 120 has two available routes to communicate the flow through the LAN 104 from the server 116 and the destination storage node 130: (1) via the switch 124 and (2) via the switch 126. Once selected, the flow's route is traditionally fixed for the duration of the flow. However, using dynamic latency-based routing, the source switch 120 can detect a latency condition within the SAN 104 and trigger a rerouting to redirect the flow (or one or more other flows) to another available route. For example, the source switch 120 can initially communicate a flow via the switch 124, detect a latency condition along that route, and therefore reroute a flow through the switch 126 based on a latency map of the SAN 104.

To develop a latency map of either network (e.g., the LAN 102 or the SAN 104), the appropriate source switch periodically, or in response to an alternative probe condition, deploys latency probe packets along available routes in the network. The destination switches at the termini of the routes send back the latency probe packets along the same route, and the source switch records the round trip travel time of the latency probe packet in a latency map it maintains for its available routes. When the source switch is triggered to dynamically adjust routing of one or more flows because of a latency condition, the source switch consults the latency map to determine how the flows should be rerouted.

It should be understood, however, that a latency map may also be developed based on one-way travel times, wherein each latency probe packet includes a transmit time stamp from the source switch and the destination switch computes relative latencies among all of the latency probe packets it receives in association with a given flow. The destination switch can thereafter send the relative latencies back to the source switch for inclusion in the source switch's latency map.

Figure 2:
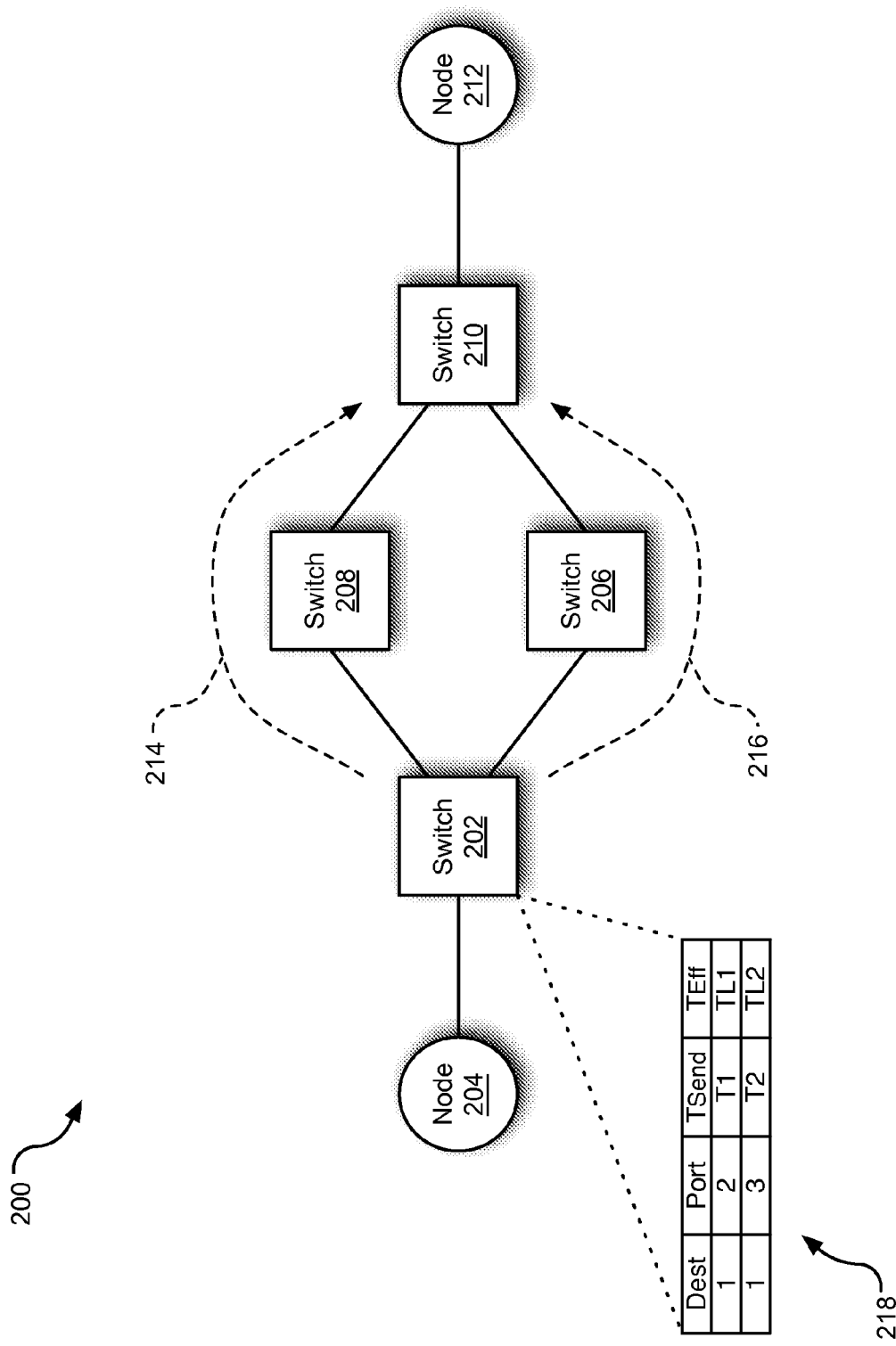
FIG. 2 illustrates an example network in which a source switch has transmitted latency probe packets along multiple available routes.

FIG. 2 illustrates an example network 200 in which a source switch 202 has transmitted latency probe packets along multiple available routes. The example network 200 is depicted as including a source node 204, the source switch 202, intervening switches 206 and 208, a destination switch 210, and a destination node 212. The source switch 202 periodically, or in response to an alternative probe condition, transmits latency probe packets along the available routes to the destination node 212 (shown by dashed arrows 214 and 216). It should be understood that the source switch 202 also supports other routes to other destination nodes (not shown) and may concurrently be transmitting latency probe packets along those other routes as well.

The source switch 202 maintains a latency map 218, which is depicted in FIG. 2 as a table. In the example latency map 218, the source switch 202 records a destination switch identifier (Dest), a port identifier (Port), a send time (TSend), and an effective latency time (TEff), although it should be understood that alternative values may be employed (e.g. an SID/DID combination, a real time latency time, an average latency time, etc.). In FIG. 2, the destination switch identifier represents a DID or port identifier of the destination switch 210 connected to the destination node 212; the port identifier represents the SID or port identifier of the source switch 202 connected to the source node 204; the send time represents the time at which a latency probe packet is transmitted from the source switch 202; and the effective latency time represents a measure of the latency on the route associated with the port identifier.

Accordingly, the latency map 218 includes two entries for the example network 200. The first row includes a destination identifier associated with the destination switch and/or the destination node, the port identifier corresponding to the upper route (i.e., through the switch 208), the time at which the latency probe packet 214 was transmitted, and the effective latency time of that route as computed based on previous latency probe packets. The second row includes a destination identifier associated with the destination switch and/or the destination node, the port identifier corresponding to the lower route (i.e., through the switch 206), the time at which the latency probe packet 216 was transmitted, and the effective latency time of that route as computed based on previous latency probe packets. It should be understood that the latency map 218 would likely incorporate more than two rows of latency data, based on a typical network topology.

In one implementation, the latency probe packets are transmitted to the destination switch based on the destination identifier and contains the SID of the node 204 (or the port of the source switch 202 connected to the source node 204) and DID of the node 212 (or the port of the destination switch 210 connected to the source node 212). In one implementation, the latency probe packet does not include the packet transmission time, but in other implementations, the packet transmission time may be carried in the latency probe packet (e.g., when using relative receive times at the destination switch to measure latency). Further, in one implementation, the latency probe packet includes a direction value that indicates whether the latency probe packet is on the first leg of its round trip or on the return leg of its round trip. For example, the latency probe packets 214 and 216 would be configured with direction value indicating that they were on the first legs of their round trips.

It should be understood that, although the described technology is focused on latency probe packets taking round trips between the source switch and the destination switch, alternative implementations may employ uni-directional latency probe packets. Such packets are transmitted from the source switch and received by the destination switch, which determines the relative latency differences among latency probe packets received from the source switch and sends a representation of these latency differences to the source switch. In this manner, the source switch can maintain a latency map that reflects the latency of a route in one direction, ignoring latency asymmetries between the legs of a round trip. The uni-directional latencies can be employed in the same manner as the round trip latencies discussed herein.

Furthermore, latencies of individual links can be employed. For example, each switch that receives a latency probe packet can intercept the packet and record the intercepting switch's identifier, the time that the switch received the packet, and the time the switch forwarded the packet into the payload of the packet as the packet is forwarded to the next switch of the route. In this manner, the source switch can develop a more detailed view of the route latencies at each link in the route. This link-specific (or "hop-to-hop") latencies can be used to determine higher performing routes within the network.

Figure 3:
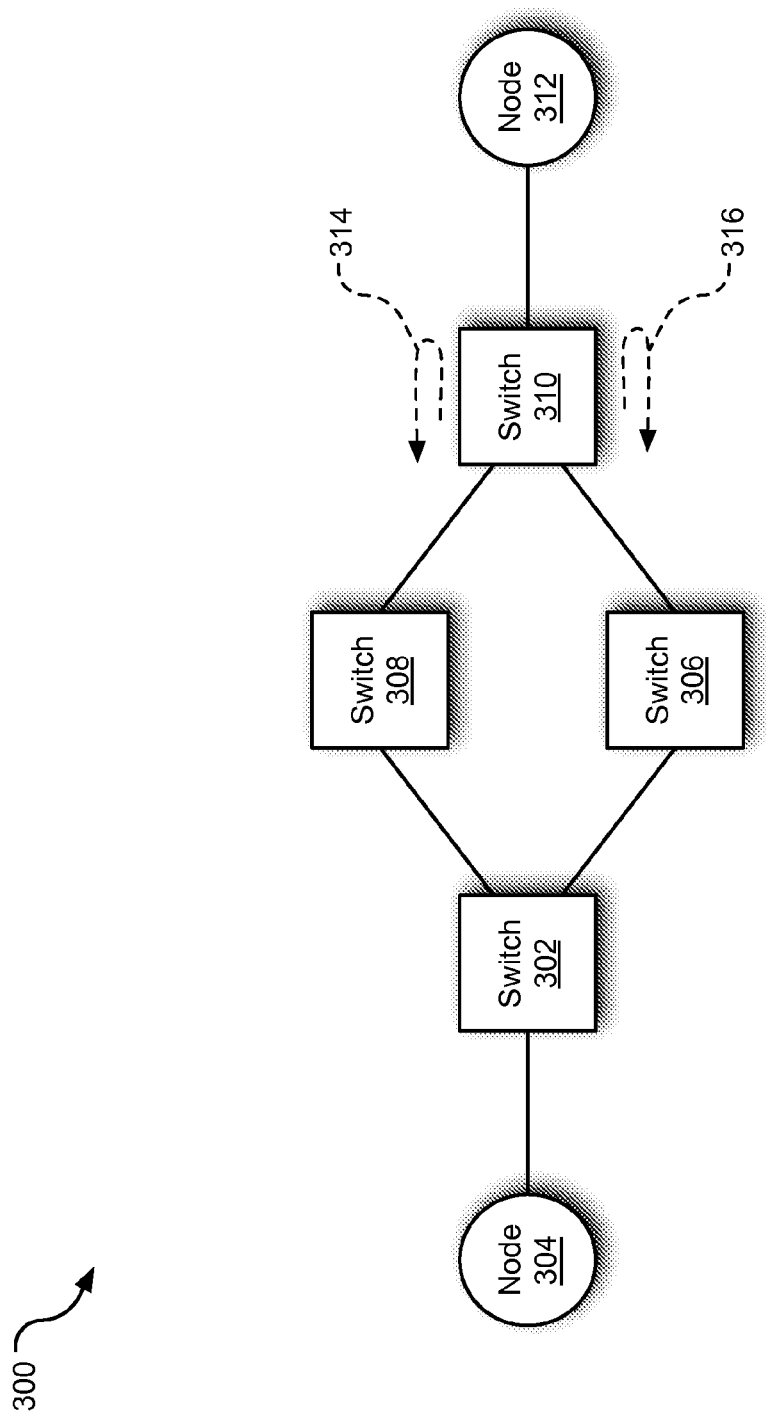
FIG. 3 illustrates an example network in which a destination switch has prepared latency probe packets for return to the source switch.

FIG. 3 illustrates an example network 300 in which a destination switch 310 has prepared latency probe packets for return to the source switch 302. The example network 300 is depicted as including a source node 304, the source switch 302, intervening switches 306 and 308, the destination switch 310, and a destination node 312. As described with regard to FIG. 2, the source switch 302 sends latency probe packets to the destination switch 310, which returns the latency probe packets to the source switch 302. As such, the destination switch 310 receives the latency probe packets from the source switch 302 and detects that it (i.e., destination switch 310) is their intended destination and that they are on the first leg of their round trips. Accordingly, the destination switch 310 switches the source and destination identifiers in the latency probe packets (shown by dashed arrows 314 and 316), modifies the direction values to indicate return legs of the round trip, and transmits the modified latency probe packets back to the source switch 302 via their respective routes.

Figure 4:
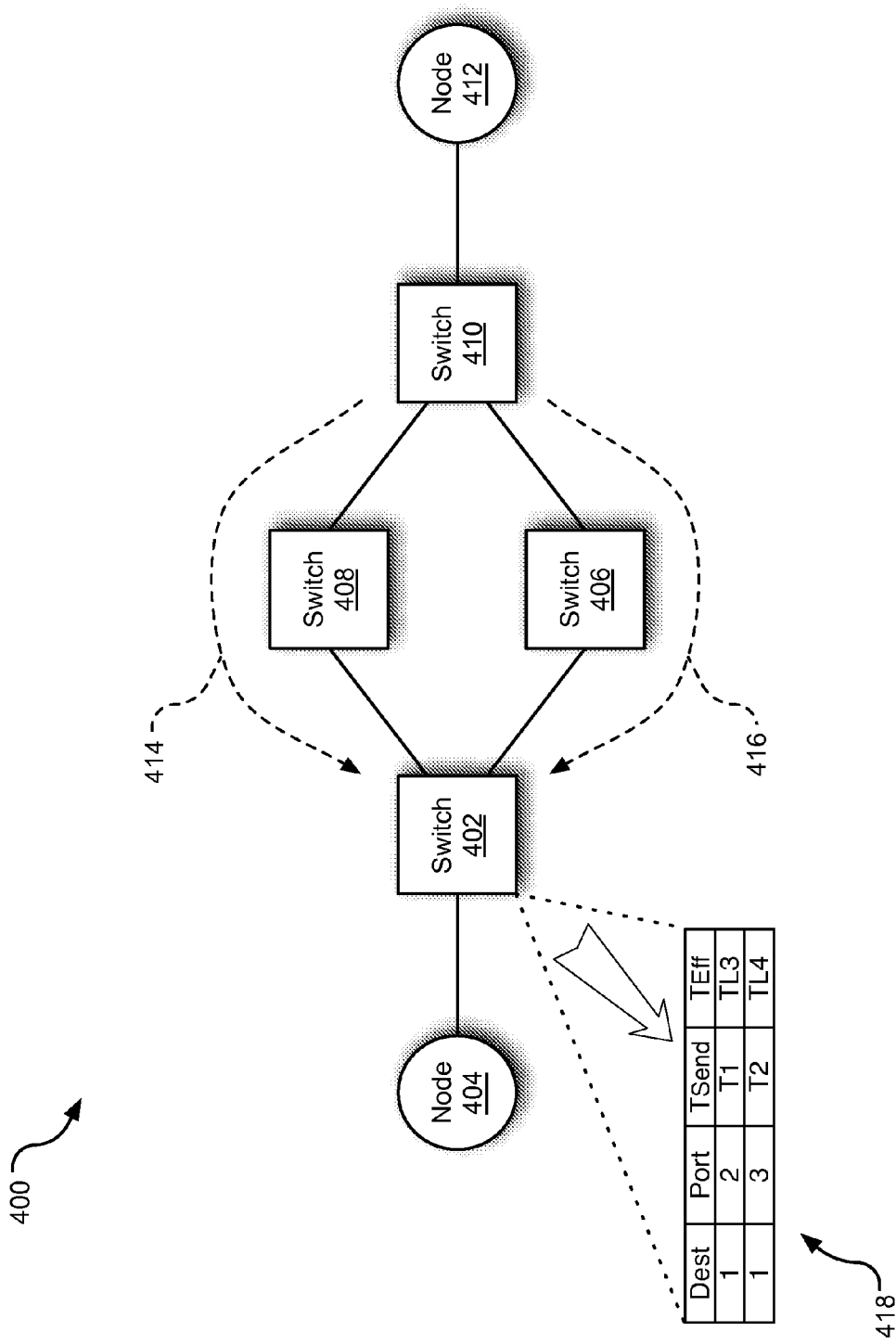
FIG. 4 illustrates an example network in which a destination switch has transmitted latency probe packets back to the source switch, which updates the latency map of its available routes.

FIG. 4 illustrates an example network 400 in which a destination switch 410 has transmitted latency probe packets back to the source switch 402, which updates the latency map 418 of its available routes. The example network 400 is depicted as including a source node 404, the source switch 402, intervening switches 406 and 408, the destination switch 410, and a destination node 412. The source switch 402 receives the latency probe packets, recording a reception time stamp for each (e.g., T3 for the upper route through switch 408 and T4 for the lower route through switch 406). The source switch 402 uses the reception time stamp to compute an effective latency time for the route traveled by the latency probe packet. The source switch 402 uses the various effective latency times of its available routes when determining how to route a flow.

In one implementation, the effective latency time measure is computed using a weighted combination of the previous effective latency time (e.g., TL1 from FIG. 2 for the upper route) and the round trip latency time of the most recent round trip on route (e.g., T3−T1, based on the times from FIG. 2 and FIG. 4 for the upper route). Accordingly, the effective latency time measure for a route represents a contribution of latencies measured on that route over time, potential with a weighted combination. For example, the effective latency time measure TL3 may be computed using the following example algorithm:

TL3=$A$*TL1+$B$*(T3−T1), where $A$ and $B$ are weights.

In one implementation, an example A=80% and an example B=20%, although other weight values may be employed. Such a weighted running average tends to smooth out abrupt changes in latency among routes in a network, so that the effective latency time measure reflects route latency over a long period of time.

In another implementation, the effective latency time measure is computed using a real time latency measure (e.g., T3−T1). In yet another implementation, the effective latency time measure is computed using a weighted or non-weighted average over a number of latency probe packets (e.g., TL3= (TL1+(T3−T1))/(number of probes during averaged period)). Other algorithms may be employed.

Figure 5:
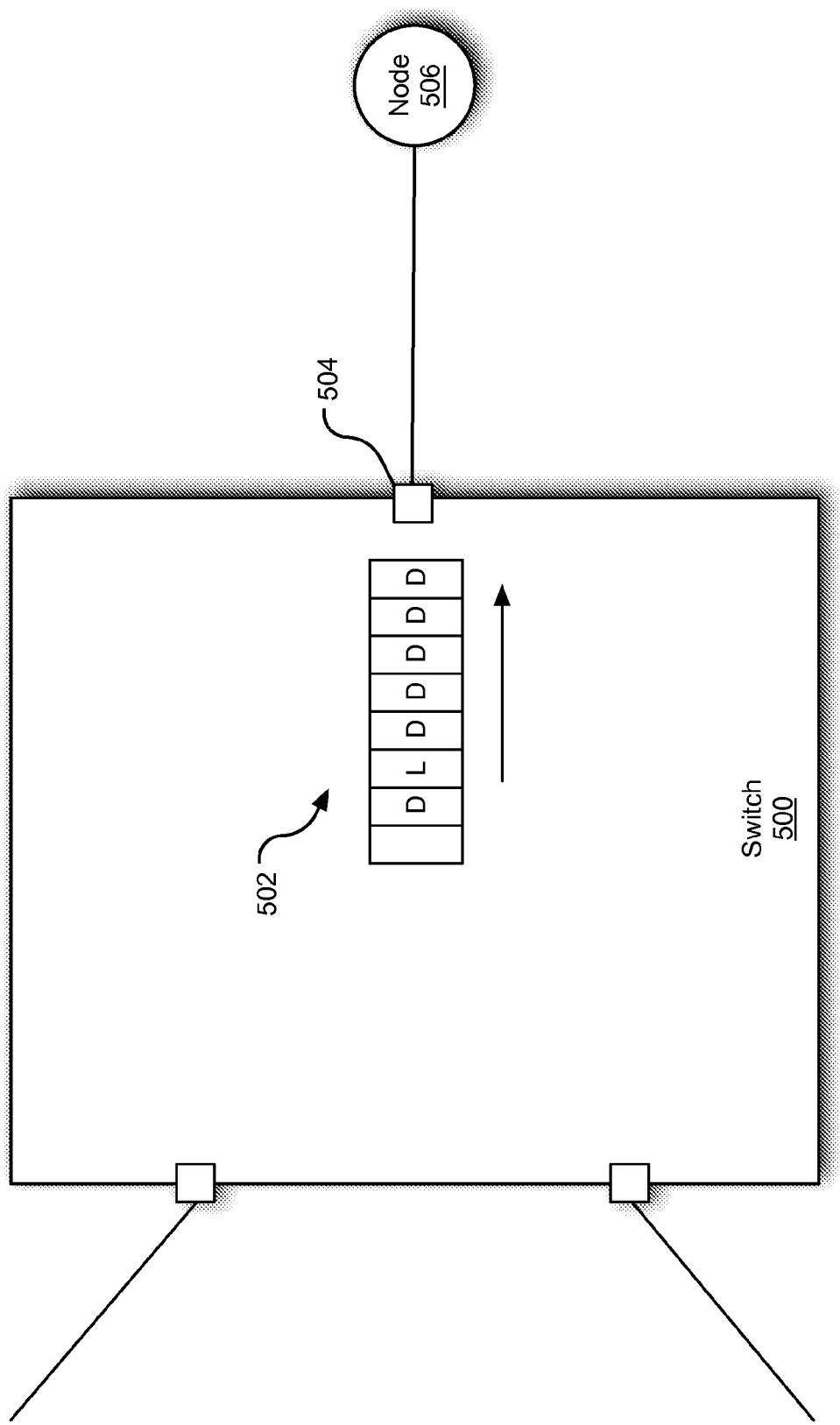
FIG. 5 illustrates an example destination switch processing a latency probe packet (L) in a transmit queue.

FIG. 5 illustrates an example destination switch 500 processing a latency probe packet (L) in a transmit queue 502, which services an egress port 504 connected to the destination node 506. In one implementation (not shown), the destination switch 500 merely modifies the latency probe packets it receives on the first legs of their round trips and transmits them on the return legs of their round trips. However, in FIG. 5, the destination switch 500 inserts the latency probe packet L into the transmit queue 502 associated with the destination node 506, monitoring the transmit queue 502 to detect when the latency probe packet L arrives at the head of the transmit queue 502.

Figure 6:
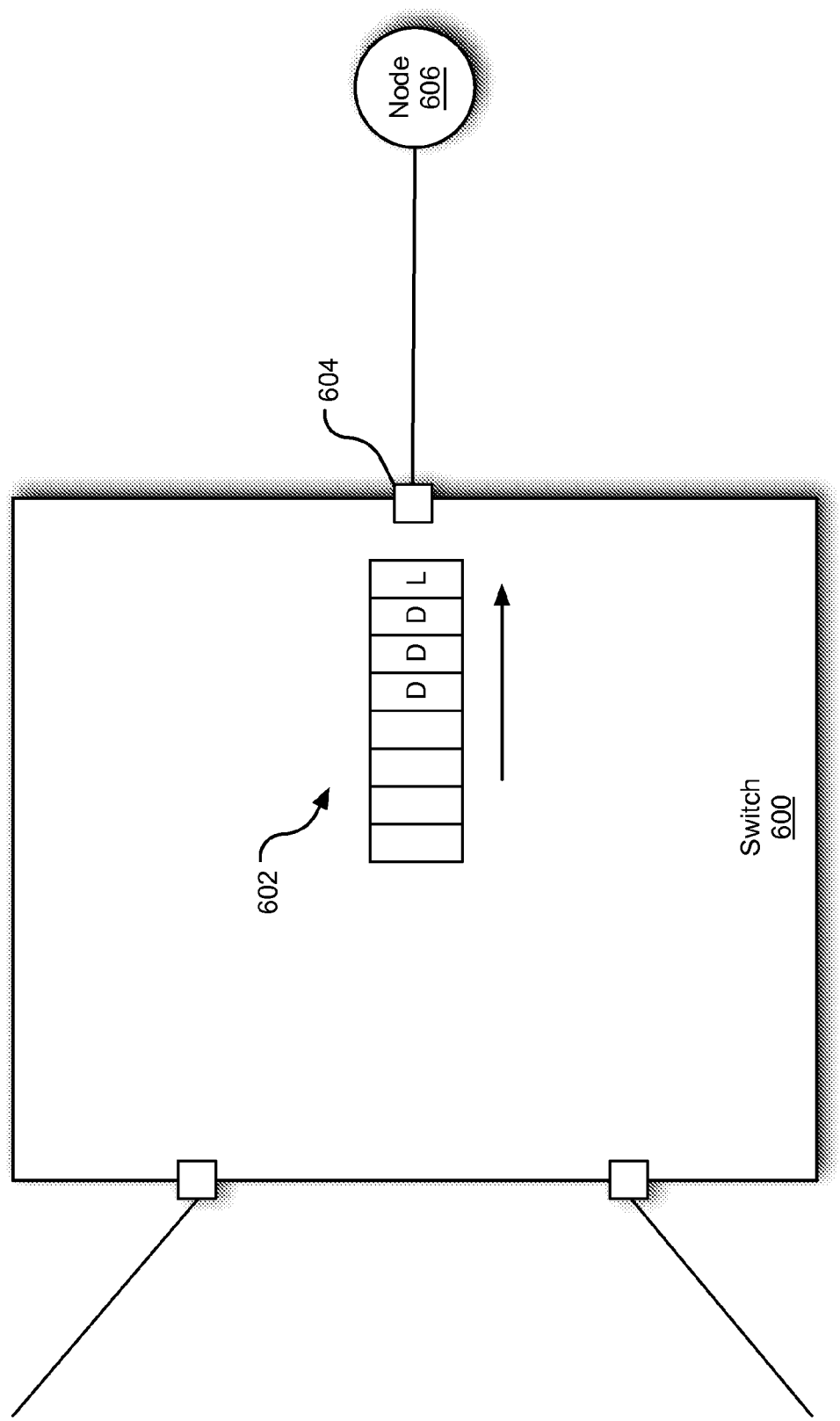
FIG. 6 illustrates an example destination switch processing a latency probe packet (L) at the head of a transmit queue.
Figure 7:
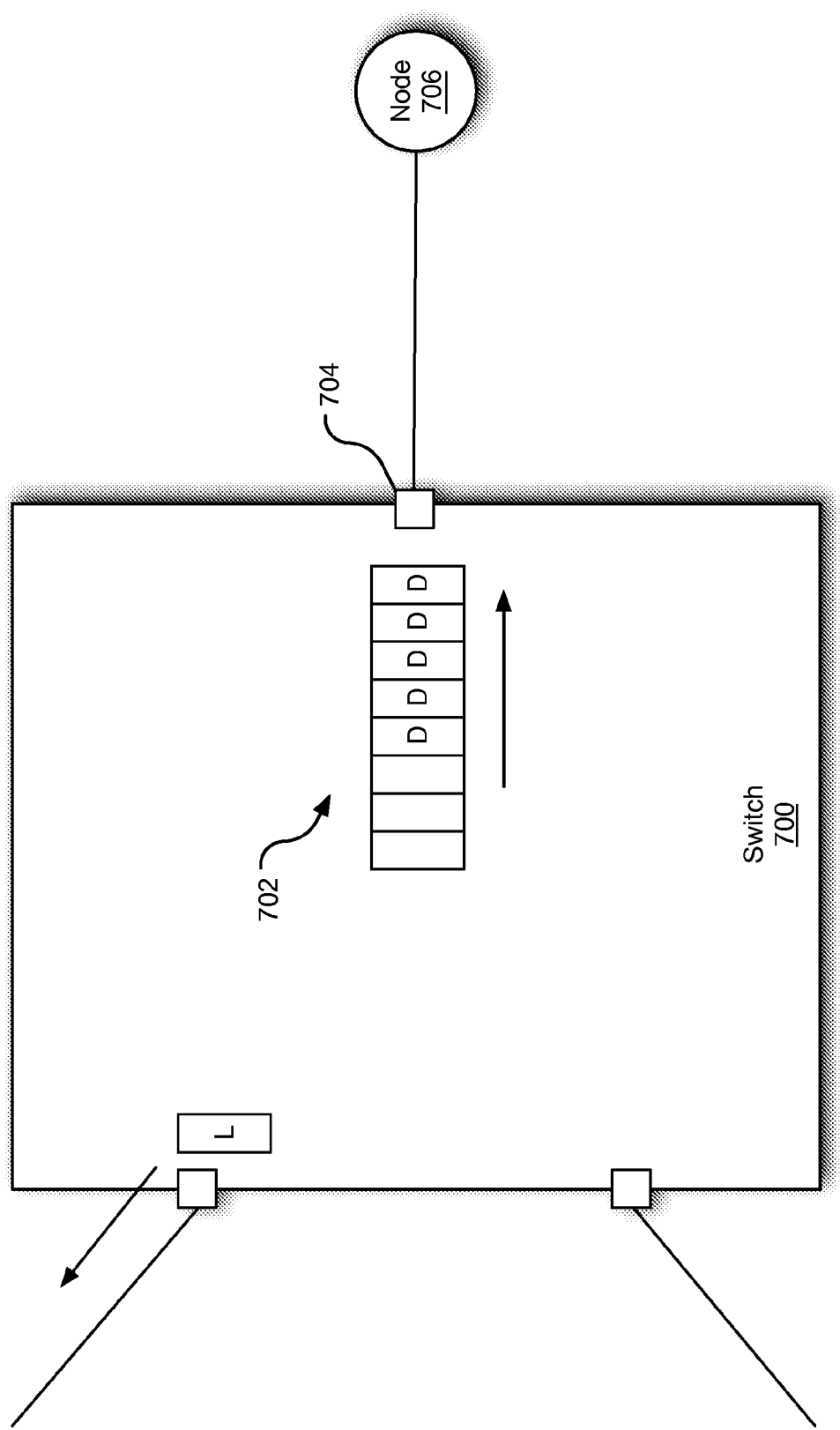
FIG. 7 illustrates an example destination switch transmitting a latency probe packet (L) to the source switch.

FIG. 6 illustrates an example destination switch 600 processing a latency probe packet (L) at the head of a transmit queue 602. In the illustrated implementation, when a latency probe packet arrives at the head of the transmit queue 602, destination switch 500 extracts the latency probe packet from the transmit queue 602 and modifies the latency probe packet L and transmits it on the return leg of its round trip, as shown in FIG. 7. In this manner, the round trip latency time of measured by the latency probe packet L includes the time spent by the latency probe packet L in the transmit queue 602. Accordingly, this approach captures the impact of a slow draining destination node or congested egress port.

Figure 8:
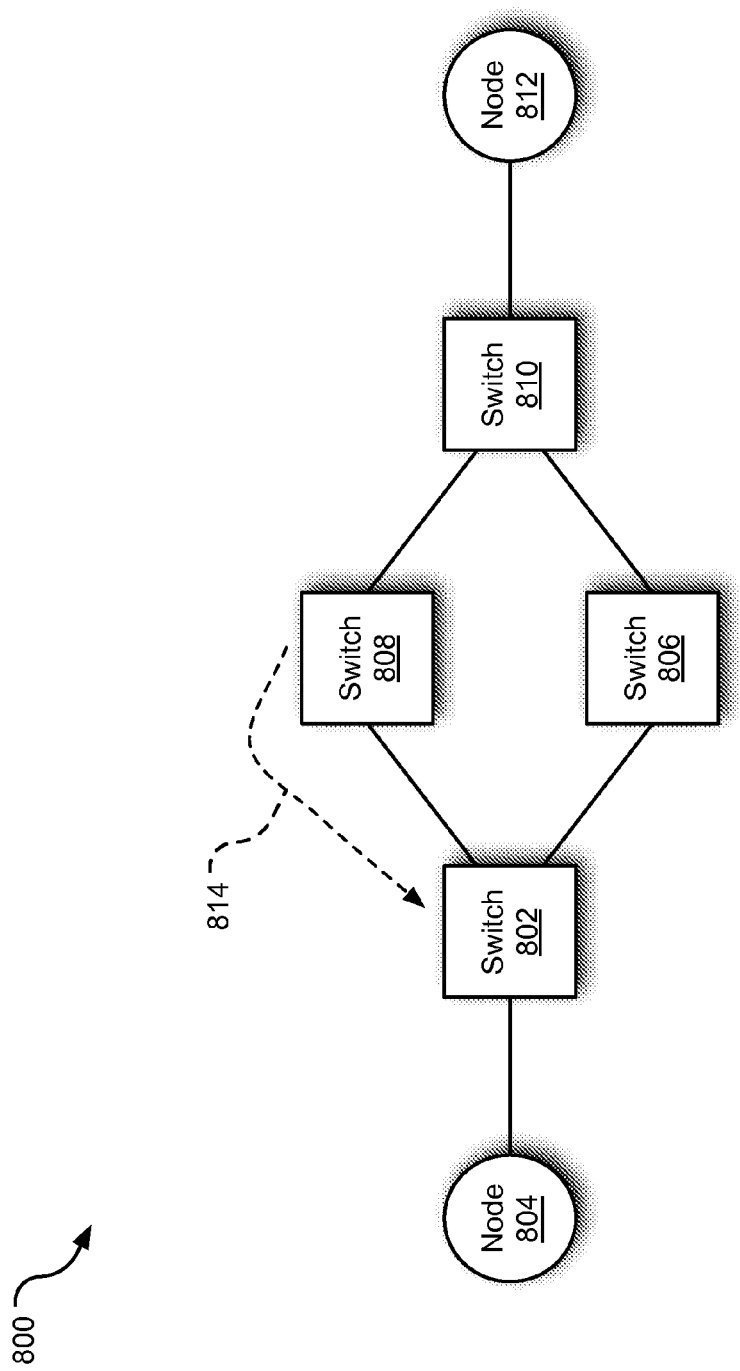
FIG. 8 illustrates an example network in which a switch is signaling the source switch about detected congestion.

FIG. 8 illustrates an example network 800 in which a switch 808 is signaling the source switch 802 about detected congestion. The example network 800 is depicted as including a source node 804, the source switch 802, intervening switches 806 and 808, a destination switch 810, and a destination node 812.

In one implementation, the switch 808 has logic (e.g., firmware and/or hardware) configured to detect congestion at its egress ports and can therefore notify the source switch 802 of the congestion. For example, the switch 808 may be receiving more frame traffic than one of its output ports can transmit, such as influenced by a slow link between the switch 808 and the switch 810. In such a circumstance, the switch 808 can inform an administrative client (not shown), which can signal the source switch 802 through a management port, or otherwise signal the source switch 802 (directly or indirectly) of the congestion on a route used by the source switch 802 (see e.g., congestion signal 814).

Based on a received congestion signal, the source switch 802 can decide to reroute a flow it knows to be routed through the congested port. In other words, the received congestion signal acts as a trigger to cause the rerouting of any flow from the source switch 802 through the congested port. The source switch 802 consults its latency map (not shown), waits for an acceptable time (e.g., 500 ms) to redirect the flow, and updates its routing table (not shown) to redirect the flow to a route with less latency. While waiting, the source switch 802 will hold transmission on the flow until the expiration of the wait time.

Figure 9:
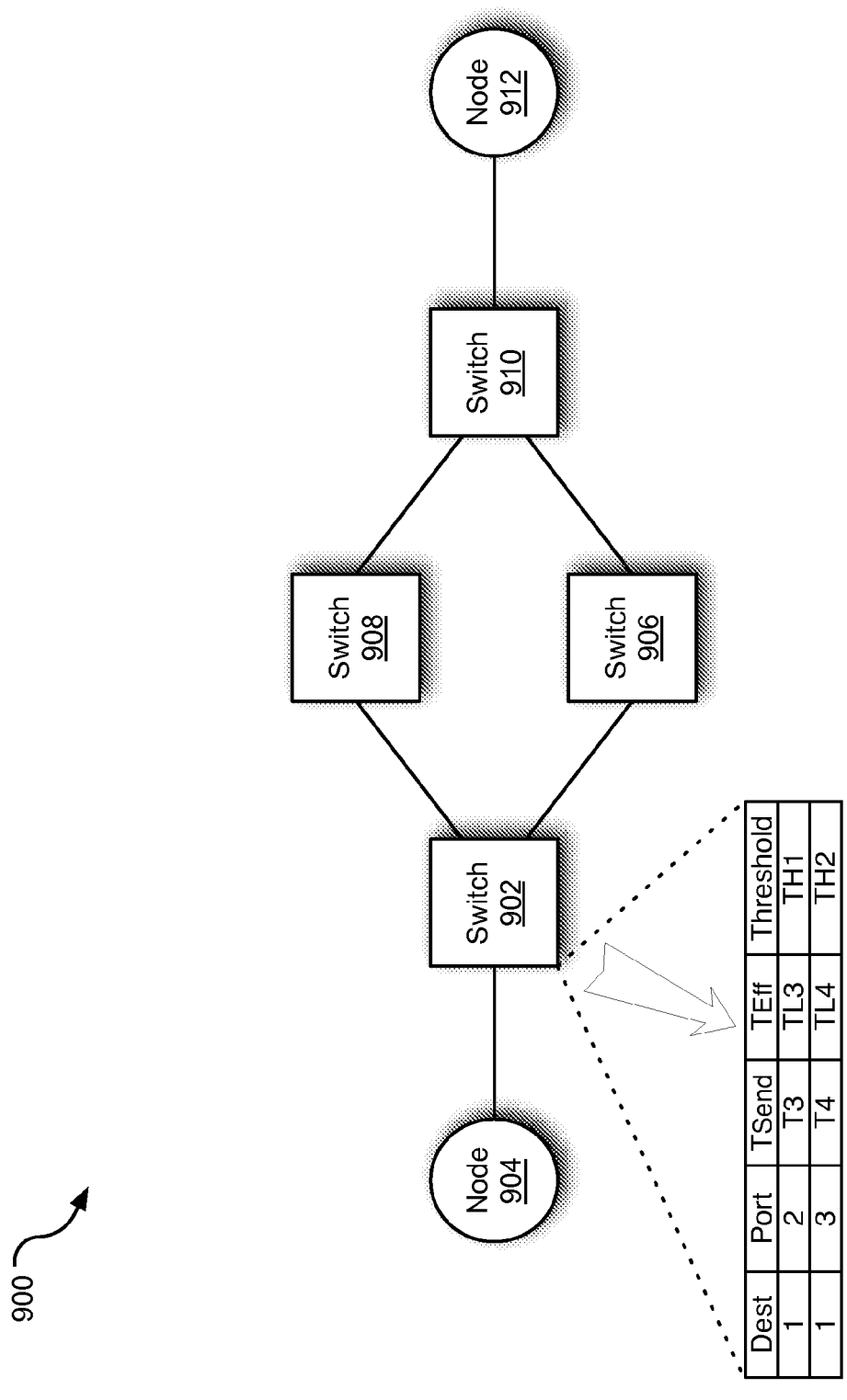
FIG. 9 illustrates an example network in which latency of a route has exceeded a predetermined threshold.

FIG. 9 illustrates an example network 900 in which latency of a route has exceeded a predetermined threshold. The example network 900 is depicted as including a source node 904, a source switch 902, intervening switches 906 and 908, a destination switch 910, and a destination node 912. A recent latency probing by the source switch 902 has resulted in the effective latency time measures of TL3 for the route associated with port number 2 and TL4 for the route associated with port number 3, which are recorded in a latency map 918.

In one implementation, the latency map 918 also stores thresholds on a per-route basis. If the source switch 902 detects that the TEff associated with a route used by a flow exceeds the threshold set for the route, then the source switch 902 triggers a re-routing operation, which evaluates the latency map, waits for an acceptable time to redirect the flow, and updates its routing table (not shown) to redirect the flow to a route with less latency. While waiting, the source switch 902 will hold transmission on the flow until the expiration of the wait time.

Figure 10:
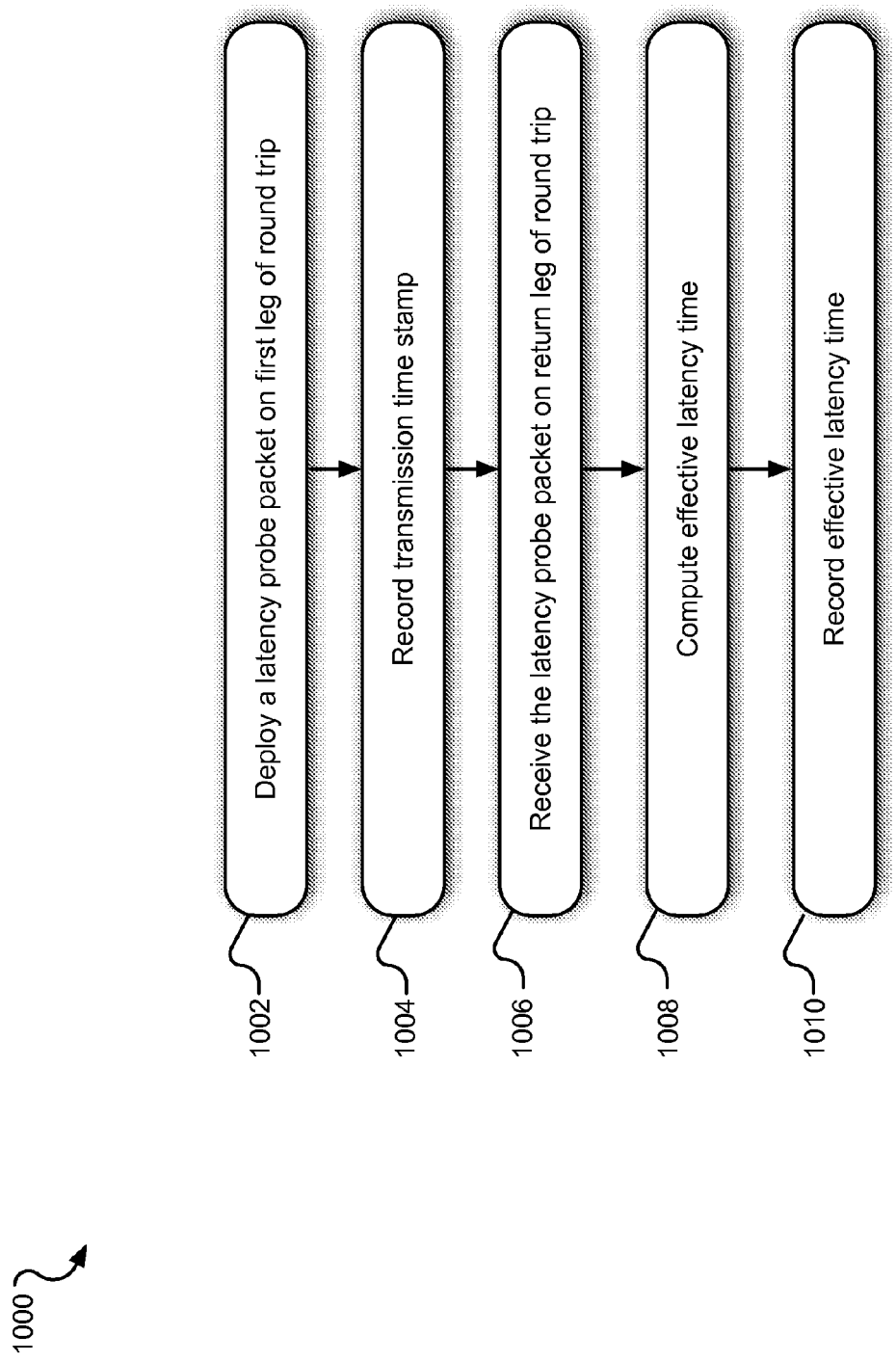
FIG. 10 illustrates example operations for maintaining a latency map.

FIG. 10 illustrates example operations 1000 for maintaining a latency map. A probing operation 1002 deploys a latency probe packet on a first leg of a round trip. Typically, multiple probing operations are performed concurrently resulting is multiple latency probe packets being deployed into a network. In one implementation, a source switch periodically, or in response to an alternative probe condition, transmits latency probe packets along available routes to one or more destination switches. For example, if the source switch has 64 egress ports and services flows to 128 different destination switches, the source switch may sends multiple latency probe packets out multiple egress ports destined for different destination switches. In one implementation, the latency probe packet includes a direction value indicate that the source switch has transmitted the latency probe packet on the first leg of its round trip. The destination switch will modify the direction value to indicate its transmission of the latency probe packet to the source switch is the return let of the packet's round trip.

A probe condition may be set by a timer to trigger periodic transmission of latency probes into the network. Alternatively, other probe conditions may be employed, including physical connection of a new node or switch in the network, a management command from an administrative station, receipt of a congestion signal, detection of a new flow, detection of termination of a flow, etc.

A time stamp operation 1004 records a time stamp relating to the transmission of the latency probe packet. In one implementation, the transmission time stamp is recorded in a field in a latency map data structure maintained by a source switch, although latency maps may be maintained in a central or otherwise aggregated data store (e.g., by an administrative station).

A reception operation 1006 receives the latency probe packet on the return leg of its round trip. Because the destination switch modified the direction value in the latency probe packet to indicate a return trip, the source switch can detect that the latency probe packet has return on its round trip.

A computation operation 1008 computes an effective latency time. In one implementation, the effective latency time measure is computed using a weighted combination of the previous effective latency time and the round trip latency time of the most recent round trip on route. An example A=80% and an example B=20%, although other weight values may be employed. A weighted combination tends to smooth out abrupt changes in latency among routes in a network, so that the effective latency time measure reflects route latency over a long period of time. In another implementation, the effective latency time measure is computed using a real time latency measure. In yet another implementation, the effective latency time measure is computed using a weighted or non-weighted average over a number of latency probe packets. Other algorithms may be employed. A recordation operation 1010 records the effective latency time into the latency map data structure for evaluation during a dynamic rerouting operation.

Figure 11:
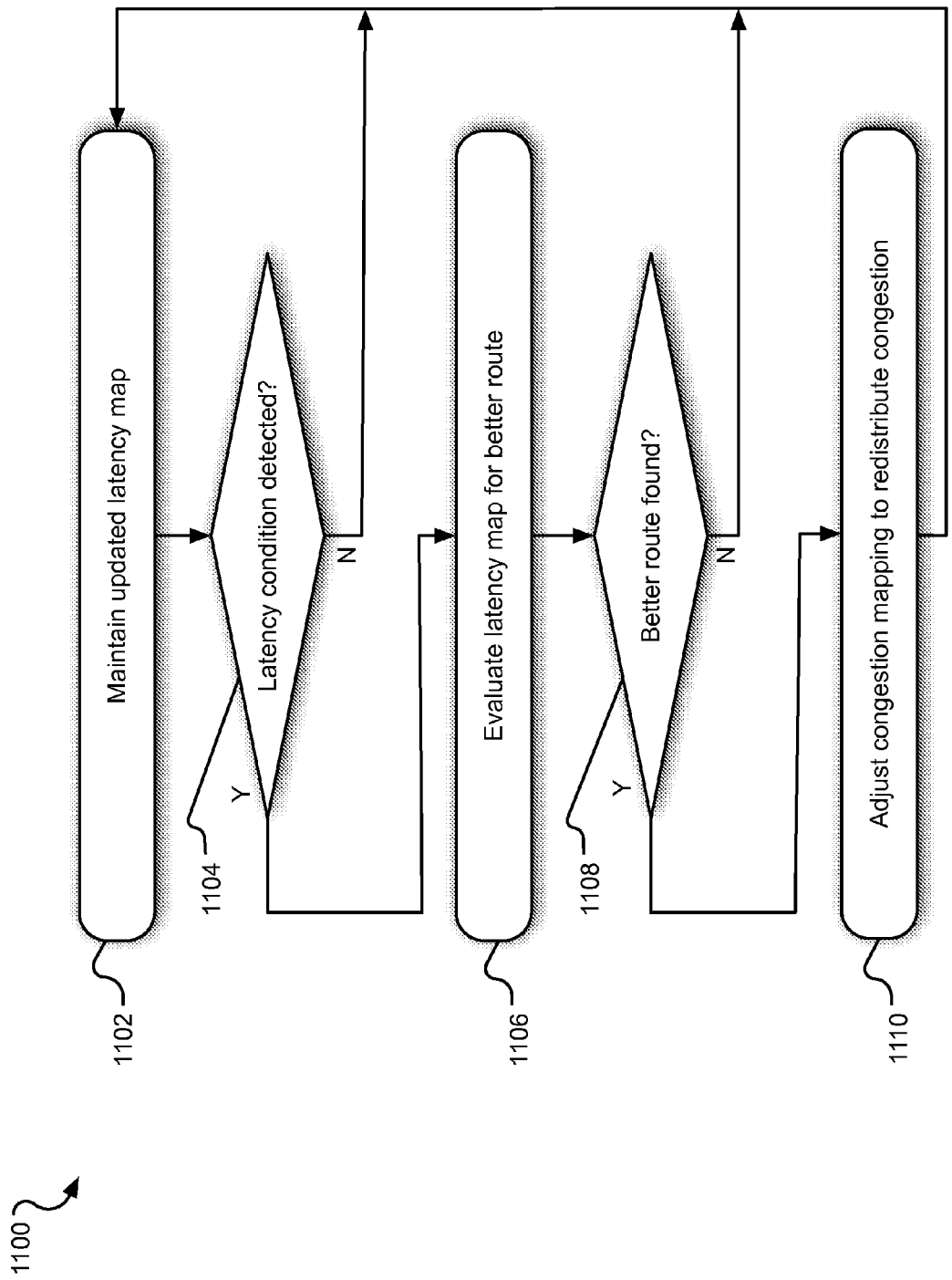
FIG. 11 illustrates example operations for dynamically adjusting routing for a flow.

FIG. 11 illustrates example operations 1100 for dynamically adjusting routing for a flow. A maintenance operation 1102 maintains an updated latency map associated with a switch, such as by the example operations described with regard to FIG. 10. A decision operation 1104 determines whether a latency condition has been detected. A variety of latency conditions may be employed. For example, receipt of a congestion signal from a switch in the network may constitute a latency condition. Alternatively, an effective latency time stored in the latency map that exceeds a configured latency threshold may constitute a latency condition. Other factors may also or alternatively be considered as latency conditions. If a latency condition is not detected in the decision operation 1104, processing returns to the maintenance operation 1102.

If a latency condition is detected in the decision operation 1104, an evaluation operation 1106 evaluates the latency map to determine a new route. For example, the flow may be currently directed on a first route, and the source switch evaluates the latency map to identify another route that is available to the destination switch or port and has a lower effective latency time. If a better route is not found, as determined by a decision operation 1108, then processing proceeds to the maintenance operation 1102.

If the decision operation 1108 finds a better route (e.g., one with a lower effective latency time than the existing route), then a rerouting operation 1110 adjusts congestion mapping in the source switch, which results in redirection of one or more flows to the better route (e.g., by modifying the routing table in the switch to route packets along the new route). It should be understood that the switch may wait until it is safe to adjust the routing of the flow. For example, if the source switch has not received a flow packet for transmission into the network for a waiting time (e.g., the amount of time set by the Fibre Channel Standard, which is two seconds, or some other appropriate, such as 500 ms), then the source switch can safely redirect the flow to a new route without concern about out-of-order data packets. In other implementations, out-of-order data packets are not an issue and so the source switch can redirect the routing at any time. Processing then returns to the maintenance operation 1102.

In one implementation, the congestion mapping initially allocates routing to individual route on a statistical basis, wherein an individual flow has an equal probability of being assigned to any individual (available) route. However, as latency conditions are detected, the source switch adjusts that routing probability of one or more routes, such that a lower latency route has a higher probability of being selected during the rerouting than a higher latency route. Furthermore, the dynamic adjustment process can be incrementally imposed so that when a particular route exhibits a latency condition, the routing probability is shifted by some predefined or computed amount in favor of the lower latency routes. If a latency condition occurs on the same route again, then the routing probability can be shifted again, repeating this process until the congestion has stabilized.

Figure 12:
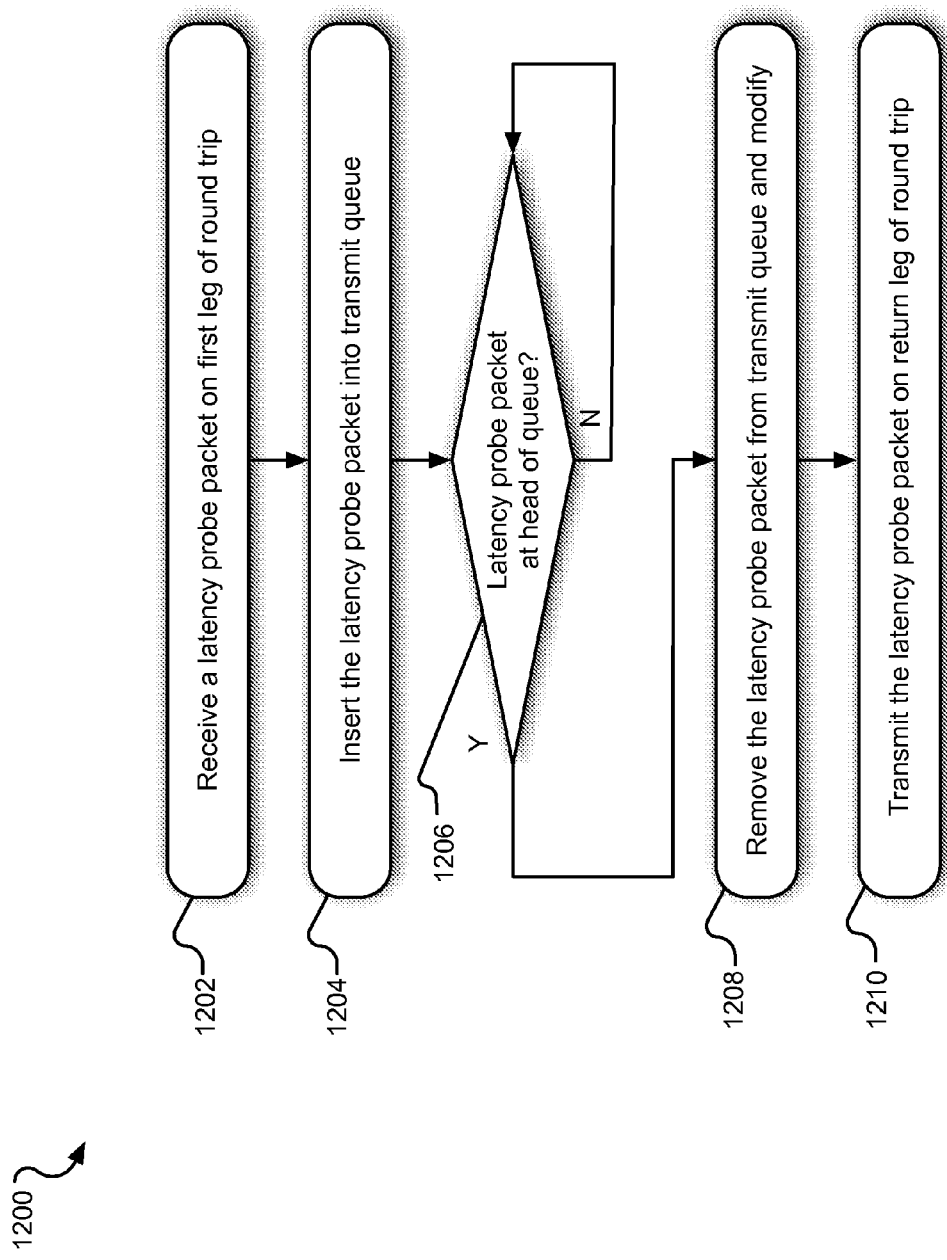
FIG. 12 illustrates example operations for returning a latency probe packet.

FIG. 12 illustrates example operations 1200 for returning a latency probe packet. A receive operation 1202 receives a latency probe packet on a first leg of a round trip. The latency probe packet is associated with a specific flow and was transmitted from a source switch to a destination switch with a direction value set to indicate the first leg of the round trip. A queuing operation 1204 inserts a latency probe packet into a transmit queue associated with the destination node of the flow. A decision operation 1206 monitors the transmit queue to determine when the latency probe packet reaches the head of the transmit queue.

When the latency probe packet reaches the end of the transmit queue, a dequeuing operation 1208 removes the latency probe packet from the transmit queue and modifies it to travel on its return leg of the round trip back to the source switch. For example, the source identifier and destination identifier are swapped in the latency probe packet and the direction value is set to identify the return leg of the round trip. A transmission operation 1210 transmits the latency probe packet to the source switch on the return leg of its round trip.

Figure 13:
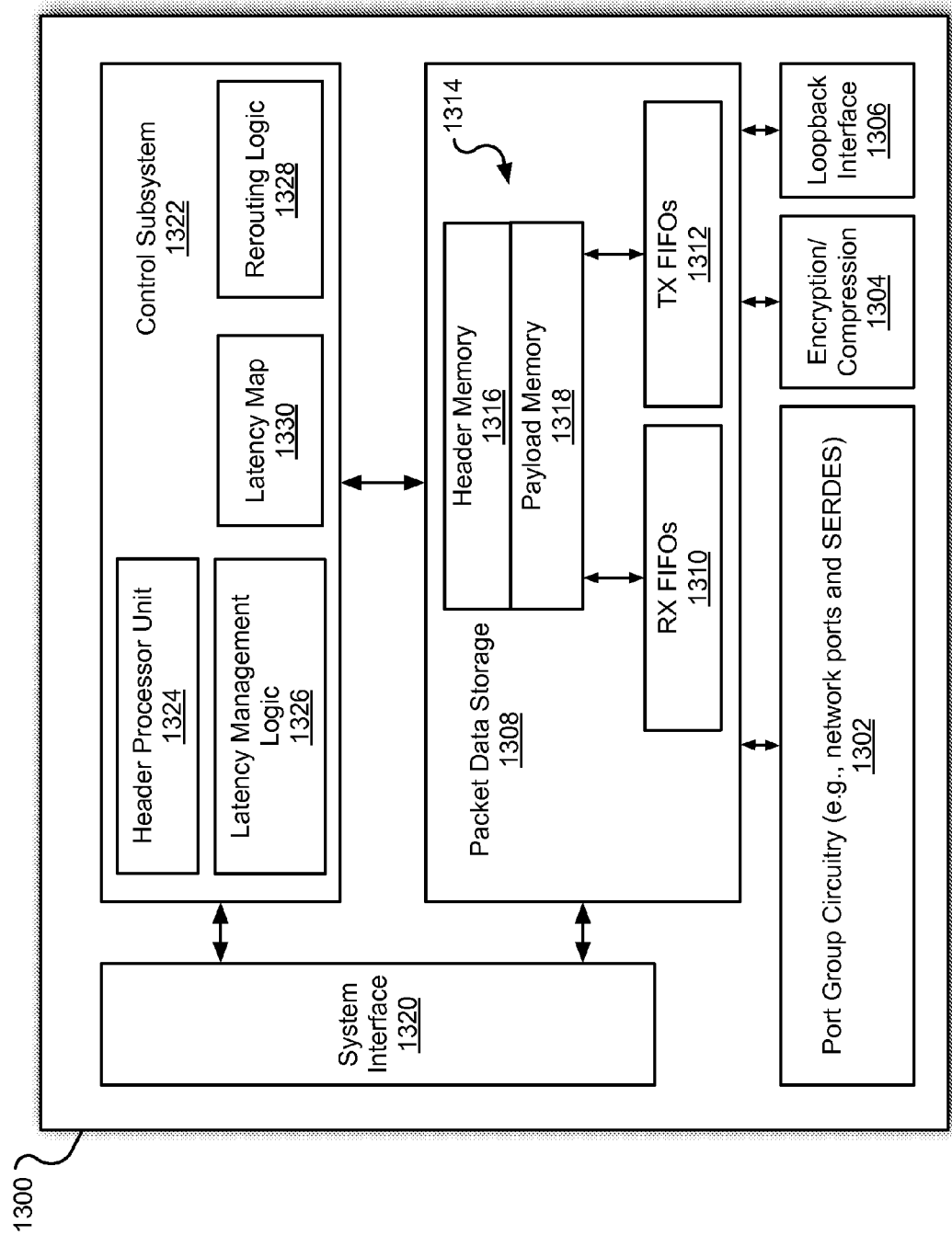
FIG. 13 illustrates an example switch architecture configured to implement dynamic latency-based rerouting.

FIG. 13 illustrates an example switch architecture 1100 configured to implement dynamic latency-based rerouting. In the illustrated architecture, the switch represents a Fibre Channel switch, but it should be understood that other types of switches, including Ethernet switches, may be employed. Port group circuitry 1302 includes the Fibre Channel ports and Serializers/Deserializers (SERDES) for the network interface. Data packets are received and transmitted through the port group circuitry 1302 during operation. Encryption/compression circuitry 1304 contains logic to carry out encryption/compression or decompression/decryption operations on received and transmitted packets. The encryption/compression circuitry 1304 is connected to 6 internal ports and can support up to a maximum of 65 Gbps bandwidth for compression/decompression and 32 Gbps bandwidth for encryptions/decryption, although other configurations may support larger bandwidths for both. Some implementations may omit the encryption/compression 1304. A loopback interface 1306 is used to support Switched Port Analyzer (SPAN) functionality by looping outgoing packets back to packet buffer memory.

Packet data storage 1308 includes receive (RX) FIFOs 1310 and transmit (TX) FIFOs 1312 constituting assorted receive and transmit queues. The packet data storage 1308 also includes control circuitry (not shown) and centralized packet buffer memory 1314, which includes two separate physical memory interfaces: one to hold the packet header (i.e., header memory 1316) and the other to hold the payload (i.e., payload memory 1318). A system interface 1320 provides a processor within the switch with a programming and internal communications interface. The system interface 1320 includes without limitation a PCI Express Core, a DMA engine to deliver packets, a packet generator to support multicast/hello/network latency features, a DMA engine to upload statistics to the processor, and top-level register interface block.

A control subsystem 1322 includes without limitation a header processing unit 1324 that contains switch control path functional blocks. All arriving packet descriptors are sequenced and passed through a pipeline of the header processor unit 1324 and filtering blocks until they reach their destination transmit queue. The header processor unit 1324 carries out L2 Switching, Fibre Channel Routing, LUN Zoning, LUN redirection, Link table Statistics, VSAN routing, Hard Zoning, SPAN support, and Encryption/Decryption.

The control subsystem 1322 is also illustrated as including latency management logic 1326, rerouting logic 1328, and a latency map 1330 (e.g., a memory-resident data table). In one implementation, the latency management logic 1326 constructs, deploys, and receives the latency probe packets via the available routes. The latency management logic 1326 also manages the latency map 1330, including one or more of the following: recording the transmission time stamps, computing TEff for multiple routes, detecting latency conditions, identifying the lower latency routes relative to a congested or higher latency route, etc. When a better route is identified (e.g., in response to a latency condition), the routing logic 1328 adjusts the routing of one or more flows. For example, the probability of routing flows to the lower latency route can be increased to create a dynamic shift of flow traffic to the lower latency route. Furthermore, the rerouting logic 1328 can also decide to hold flow traffic through a higher latency route for a waiting period and thereafter shift that flow traffic to an alternative lower latency route.

A network switch may also include one or more processor-readable storage media encoding computer-executable instructions for executing one or more processes of dynamic latency-based rerouting on the network switch. It should also be understood that various types of switches (e.g., Fibre Channel switches, Ethernet switches, etc.) may employ a different architecture that that explicitly describe in the exemplary implementations disclosed herein.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A switch comprising:
   a latency management logic configurable to obtain latency information from a probe packet, wherein the latency information indicates latency associated with a route from the switch;
   a rerouting logic configurable adjust a local routing decision for one or more flows through the switch based on the latency information in the probe packet; and
   a packet processor configurable to:
      remove a second probe packet associated with a second switch from head of a transmission queue; and
      insert the second probe packet into head of a second transmission queue of associated with the second switch after modifying the second probe packet.

2. The switch of claim 1, further comprising:
   a latency map configurable to record one or more effective latency time measures associated with the route from the switch.

3. The switch of claim 2, wherein the latency management module is further configurable to compute the one or more effective latency time measures using a weighted running average of latencies detected over time for the route.

4. The network source switch of claim 1, wherein the latency management module is further configurable to obtain latency information from a plurality of probe packets, wherein the latency information indicates latency associated with the route from the switch.

5. The switch of claim 4, wherein the latency management module is further configurable to record in a latency map one or more effective latency time measures based on the obtained latency information.

6. The switch of claim 1, wherein the rerouting module is further configurable to adjust the local routing decision by increasing a probability of a flow being routed via the route.

7. The switch of claim 1, wherein the rerouting module is further configurable to adjust the local routing decision by decreasing a probability of a flow being routed via route.

8. The switch of claim 1, wherein the latency management module is further configurable to construct the probe packet for obtaining the latency information associated with the route from the switch.

9. The switch of claim 1, wherein the latency management module is further configurable to compute an effective latency time associated with the route based on a round trip time of the probe packet.

10. The switch of claim 1, wherein the packet processor is further configurable to identify the second probe packet from the head of the transmission queue as being associated with the second switch.

11. The switch of claim 1, wherein the latency management module is further configurable to periodically construct probe packets to update an effective latency time measure of the route in a latency map.

12. The switch of claim 1, wherein the rerouting module is further configurable to adjust the local routing decision that reroutes a flow from a higher latency route to a lower latency route.

13. A method comprising:
obtaining latency information from a probe packet, wherein the latency information indicates latency associated with a route from a switch;
adjusting a local routing decision for one or more flows through the switch based on the latency information in the probe packet;
removing a second probe packet associated with a second switch from head of a transmission queue; and
inserting the second probe packet into head of a second transmission queue of associated with the second switch after modifying the second probe packet.

14. The method of claim 13, further comprising:
recording in a latency map one or more effective latency time measures associated with the route from the switch.

15. The method of claim 14, further comprising computing the one or more effective latency time measures using a weighted running average of latencies detected over time for the route.

16. The method of claim 13, further comprising obtaining latency information from a plurality of probe packets, wherein the latency information indicates latency associated with the route from the switch.

17. The method of claim 16, further comprising:
recording in a latency map one or more effective latency time measures based on the obtained latency information.

18. The method of claim 13, further comprising:
adjusting the local routing decision by increasing a probability of a flow being routed via the route.

19. The method of claim 13, further comprising:
adjusting the local routing decision by decreasing a probability of a flow being routed via the route.

20. The method of claim 13, further comprising:
constructing the probe packet for obtaining the latency information associated with the route from the switch.

21. The method of claim 13, further comprising:
computing an effective latency time measure of the route based on a round trip time of the probe packet.

22. The method of claim 13, wherein the receiving operation comprises:
identifying the second probe packet from the head of the transmission queue as being associated with the switch.

23. The method of claim 13 further comprising:
periodically constructing probe packets to update the an effective latency time measure of the route in a latency map.

24. The method of claim 13, further comprising:
adjusting the local routing decision that reroutes a flow from a higher latency route to a lower latency route.

25. One or more non-transitory processor-readable storage media encoding processor-executable instructions for executing on a switch a process comprising:
obtaining latency information from a probe packet, wherein the latency information indicates latency associated with a route from the switch responsive to detection of a latency condition on a higher latency route from the source switch; and
adjusting a local routing decision for one or more flows through the switch based on the latency information in the probe packet;
removing a second probe packet associated with a second switch from head of a transmission queue; and
inserting the second probe packet into head of a second transmission queue of associated with the second switch after modifying the second probe packet.

* * * * *